United States Patent [19]

Murata et al.

[11] Patent Number: 5,718,114
[45] Date of Patent: Feb. 17, 1998

[54] ONE-WAY CLUTCH MECHANISM OF TORQUE CONVERTER

[75] Inventors: Kiyohito Murata; Shogo Matsumoto; Hiroyuki Shioiri, all of Susono, Japan

[73] Assignee: Toyota Jidosha Kabushiki Kaisha, Toyota, Japan

[21] Appl. No.: 679,753

[22] Filed: Jul. 10, 1996

[30] Foreign Application Priority Data

Jul. 10, 1995 [JP] Japan ................... 7-173617
Apr. 23, 1996 [JP] Japan ................... 8-100807

[51] Int. Cl.$^6$ ........................................ F16D 33/00
[52] U.S. Cl. ........................................ 60/343; 60/345
[58] Field of Search ........................ 60/345, 341, 343

[56] References Cited

U.S. PATENT DOCUMENTS

| 3,461,670 | 8/1969 | Waclawek | 60/343 |
|---|---|---|---|
| 3,724,208 | 4/1973 | Welch et al. | 60/343 |
| 4,441,315 | 4/1984 | Bochot | 60/345 |

FOREIGN PATENT DOCUMENTS 5-45306   6/1993   Japan .

*Primary Examiner*—Hoang Nguyen
*Attorney, Agent, or Firm*—Oblon, Spivak, McClelland, Maier, & Neustadt, P.C.

[57] ABSTRACT

The one-way clutch mechanism of a torque converter which has a short axial dimension, and which neither produces a shock noise (an abnormal sound) nor suffers a power loss in the idle mode thereof. An outer race (30 in FIG. 1) is united with a stator (18), and supports the stator (18) so as to be axially movable and rotatable with respect to a stationary shaft (16). The outer race (30) includes a first side face (32) which is formed with first teeth. An inner race (40) is united with the stationary shaft (16), and includes a second side face (42) opposite to the first side face (32). The second side face (42) is formed with second teeth which can prohibit the rotation of the outer race (30) in one direction, by meshing with the first teeth. The stator (18) and the outer race (30) receive the axial component force of a fluid stream which changes depending upon a speed ratio. Thus, the unitary structure (18, 30) comes near to or away from the inner race (40), thereby to engage or disengage the first teeth and the second teeth.

7 Claims, 16 Drawing Sheets e>1

At and near e = 1 e<1

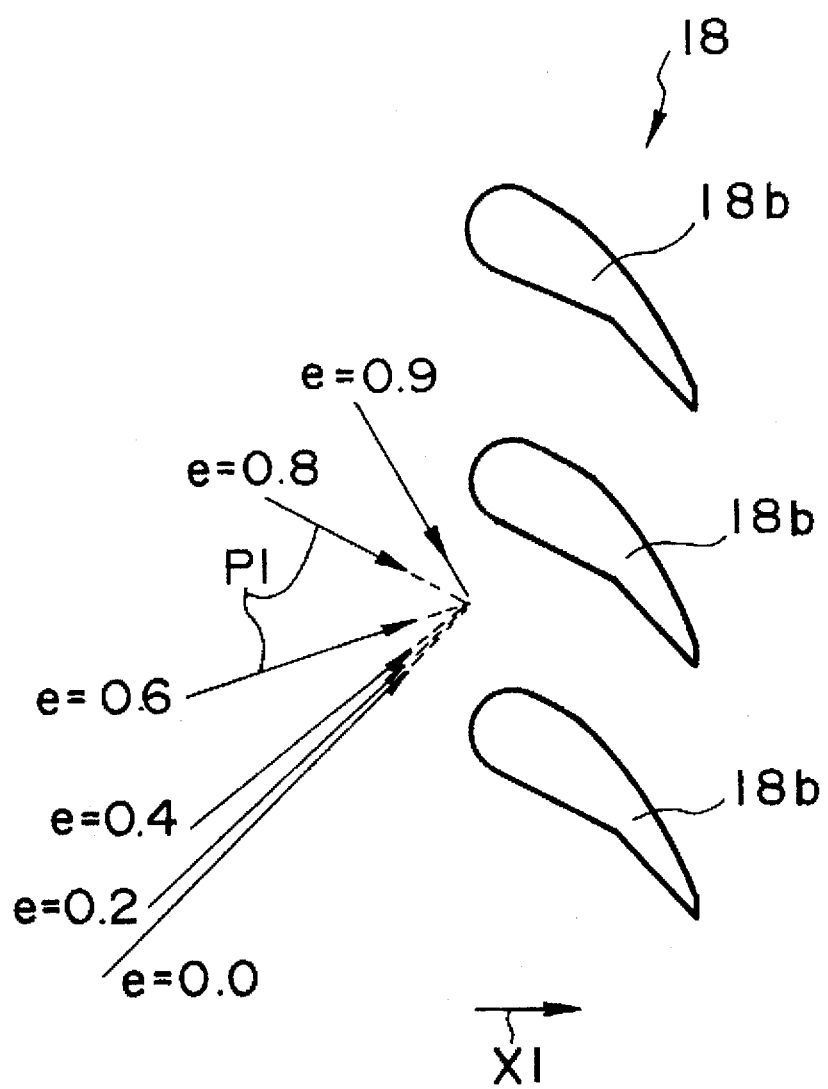

FIG.4A
FIG.4B
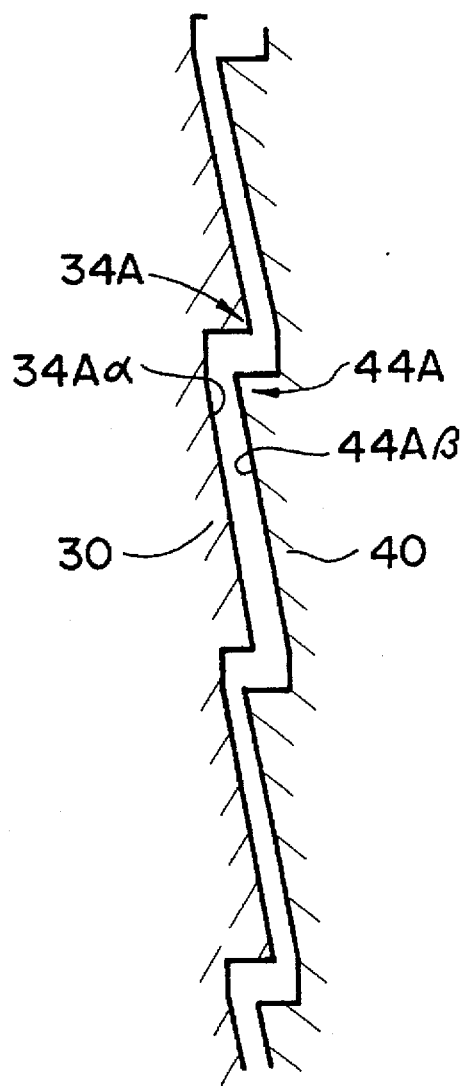
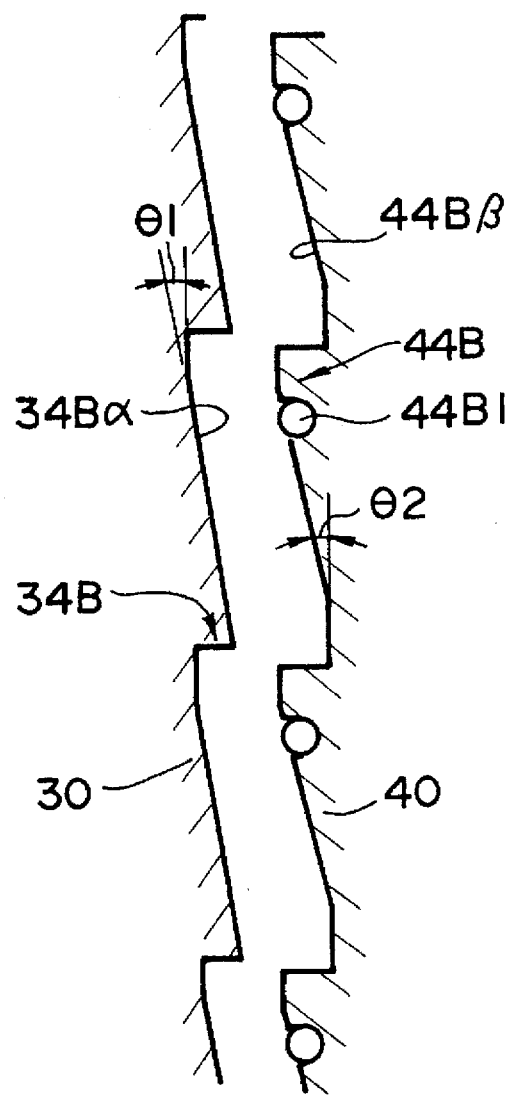

FIG.8A (Speed ratio e > Coupling point)
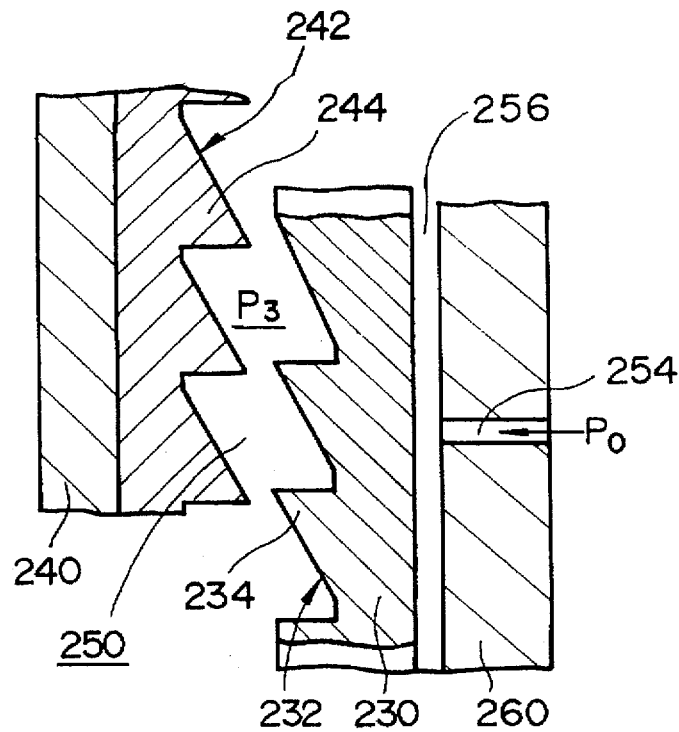
FIG.8B (Speed ratio e ≦ Coupling point)
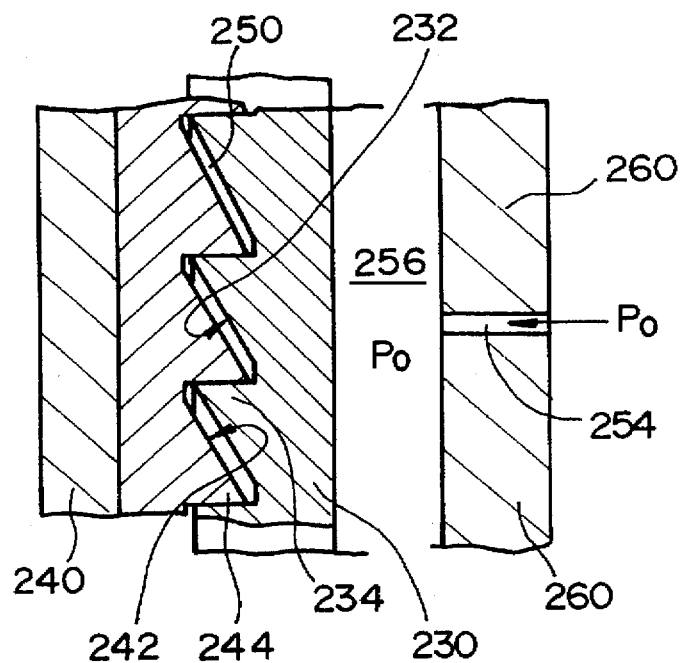

ONE-WAY CLUTCH MECHANISM OF TORQUE CONVERTER

BACKGROUND OF THE INVENTION

1. Field of the Invention

The present invention relates to the one-way clutch mechanism of a torque converter.

2. Description of the Prior Art

In general, a torque converter for a motor vehicle has a pump impeller which generates a fluid stream, a turbine runner which is rotated by the fluid stream, a stationary shaft, and a stator which is arranged between the pump impeller and the turbine runner so as to receive a turning force from the fluid stream. The stator is connected and fixed to the stationary shaft by a one-way clutch only when it has received the turning force of specified direction from the fluid stream.

The "sprag type" and the "roller type", for example, are extensively adopted as the constructions of such one-way clutches.

Each of the one-way clutches of these types, however, has the problem that parts undergo high stresses (surface pressures) due to a structure wherein the parts lie in line contact. Therefore, the one-way clutch necessitates a certain degree of width and inevitably increases in its axial dimension (size) in order that the surface pressures to act on the parts of the line contact may be kept within an allowable range.

Meanwhile, a one-way clutch constructed as shown in FIG. 19 of the accompanying drawings is disclosed in, for example, the official gazette of Japanese Utility Model Registration Application Laid-open No. 45306/1993.

The one-way clutch 912 has an outer race 913, an inner race 914 and a wave spring 915. The outer race 913 is unrotatably fixed on the inner circumferential side of a stator (not shown), and has a plurality of first teeth 913a. The inner race 914 is capable of disengagement from the outer race 913, and has a plurality of second teeth 914a which can prohibit the outer race 913 from rotating onto one side by meshing with the first teeth 913a. The wave spring 915 urges the outer race 913 toward the inner race 914.

The one-way clutch 912 disclosed in the official gazette of Japanese Utility Model Registration Application Laid-open No. 45306/1993, has the problem that, since the outer race 913 is always urged by the wave spring 915, frictional forces develop between the first teeth 913a and the second teeth 914a in the idle mode of the clutch 912 (in other words, during the release of the clutch 912), resulting in a great power loss.

Another problem is that a shock noise is produced in a case where the first teeth 913a and second teeth 914a lying in mesh are disengaged from each other and are restored into the meshed or engaged state again.

SUMMARY OF THE INVENTION

The present invention has been made in view of the problems of the prior art as stated above, and has for its object to provide the one-way clutch mechanism of a torque converter which suffers a small power loss especially in the idle mode thereof and which can suppress the production of shock noise etc.

The present invention has achieved the above object by adopting a construction, the structure of which is generally shown in FIG. 1.

In order to eliminate the problems mentioned before, the inventors thought of disengaging the first teeth 913a and second teeth 914a of the prior-art one-way clutch 912 (in the official gazette of Japanese Utility Model Registration Application Laid-open No. 45306/1993) in the idle mode thereof. However, how to disengage only in the idle mode presented a problem. More specifically, the wave spring 915 always urges the outer race 913 in the direction of meshing or engaging the first teeth 913a and second teeth 914a. In order to disengage the first and second teeth only in the idle mode while overcoming the spring bias, accordingly, the timing of the outer race 913 to rotate idle needs to be detected by any method, and moreover, a disengaging urging force needs to be generated in synchronism with the detection.

When an electrical control device is employed, an urging force in any desired direction can be generated at any desired timing. With this measure, however, the one-way clutch 912 becomes expensive, requires a space for accommodating the control device and increases in weight.

The inventors have therefore taken note of the fluid stream which is generated within the torque converter. More specifically, the specific fluid stream flows in the torque converter, and various fluid pressures act on the individual internal parts of the torque converter owing to the fluid stream. Besides, the aspect of generation of the fluid stream changes with the speed ratio e between the pump impeller and turbine runner of the torque converter, so that also the fluid pressures on the individual internal parts change.

With this point noticed, the present invention consists in that the internal fluid pressures of the torque converter are utilized in order to attain the urging forces for engaging and disengaging the first teeth on the outer race side and the second teeth on the inner race side (in order to attain at least one of the urging forces).

By way of example, each blade of the stator of the torque converter receives the force (the fluid pressure) from the fluid stream. The direction of the force which is received from the fluid stream changes as the speed ratio e changes. Accordingly, the axial component force of the fluid force changes with the speed ratio e.

In an aspect of performance of the present invention, the outer race and inner race of the one-way clutch are engaged and disengaged by making the stator movable in the axial direction of the torque converter and by utilizing the fact that the axial component force of the fluid force which acts on the stator changes depending upon the speed ratio e.

More specifically, within a speed ratio range of e<1, the fluid stream which returns from the turbine of the torque converter into the pump thereof is generated in the vicinity of the stator. Consequently, the stator and the outer race unitary therewith are axially moved by the axial component force of the fluid force of the fluid stream, thereby to engage the first teeth of the outer race and the second teeth of the inner race. Since the inner race is unitary with the stationary shaft, the stator can be fixed owing to the engagement.

On the other hand, within a range of e>1, the fluid stream which flows from the pump toward the turbine is generated in the vicinity of the stator. Therefore, the stator receives the axial component force which is reverse in direction to that in the case of e>1. Accordingly, the stator and the outer race unitary therewith are axially moved (in the reverse direction) by the received force, thereby to disengage the first teeth of the outer race and the second teeth of the inner race. Owing to the disengagement, the outer race becomes rotatable relative to the stationary shaft, and the stator simultaneously becomes rotatable.

Incidentally, as understood from the above description, the axial component force which the stator receives from the fluid stream reverses with a boundary substantially at $e=1$. Accordingly, the engagement and disengagement between the first teeth of the outer race and the second teeth of the inner race are switched basically at the same boundary.

Meanwhile, as is well known, that point of the torque converter operation at which the stator is started rotating by the change of the direction of the fluid stream is generally called the "coupling point". The position of the coupling point depends upon the design of the sense (direction) of the blades of the stator, and it is usually set at or near a speed ratio of $e=0.85$.

Accordingly, when the above-mentioned aspect of performance is strictly discussed, the stator rotates in the state in which the first teeth of the outer race are kept somewhat pressed against the second teeth of the inner race, in a region from the point at which the stator is started rotating by the change of the direction of the fluid stream (i.e., from the coupling point) to the point at which the direction of the axial component force acting on the stator reverses (i.e., to $e=1$ or so).

The urging force in this region, however, has already become very weak. Therefore, in a case where, as will be taught in each aspect of performance later, the profiles of each of the first teeth and each of the second teeth are formed beforehand so as to allow the rotation in one direction and to prohibit only the rotation in the other direction, the stator can readily rotate in the region in which the speed ratio e is greater than the coupling point.

Further, in a case where the point at which the axial component force acting on the stator reverses is positively shifted from the speed ratio of $e=1$ and where it is set in agreement with the coupling point, the drawback can be relieved more. In order to shift the point at which the axial component force acting on the stator reverses, a face (or faces) on which the stator receives the axial component force may be positively formed on one side (or both sides) in the vicinity of a stator hub, and the pressure receiving face may have its area altered appropriately or have its inclination shifted from a plane perpendicular to the axis of the torque converter.

In the above-mentioned aspect of performance, the stator itself is made axially movable, and the first teeth of the outer race and the second teeth of the inner race are engaged or disengaged by utilizing the force based on the fluid stream of the torque converter. It is therefore unnecessary to incorporate dedicated urging means, for example, the wave spring which has hitherto been indispensable. Accordingly, the number of components can be decreased to that extent, and the axial dimension of the torque converter can be shortened still further.

Besides, in the idle mode of the clutch (at and during the release of the clutch), the first teeth of the outer race and the second teeth of the inner race are disengaged by the force based on the fluid stream. Therefore, the power loss ascribable to the frictional force is not incurred, and the shock noise is not produced, either.

In a further aspect of performance, the first teeth and the second teeth are engaged or disengaged in such a way that the outer race or the inner race is similarly moved in the axial direction of the torque converter by utilizing the fluid pressure of the fluid stream as is currently acting on the blades of the stator.

As stated before, the fluid pressure acting on the blades of the stator changes depending upon the speed ratio e. In the above-mentioned aspect of performance, the fluid pressure is directly introduced into a fluid chamber which is formed between the outer race and the inner race.

Meanwhile, the outer race and the inner race are basically kept in the engaged state by an urging force (which is generated by separate urging means).

The characteristics of the fluid pressure which is introduced into the fluid chamber and which acts on the blades of the stator, change subtly in dependency on an intake portion for introducing the fluid pressure. Therefore, the neutral point of the strength relationship between the fluid pressure and the urging force can be brought into substantial agreement with the coupling point by properly selecting the intake portion.

As a result, in the region where the speed ratio e is greater than the coupling point, the first teeth and the second teeth can be disengaged by introducing into the fluid chamber the fluid pressure (stronger than the urging force) which acts on the blades of the stator. On the other hand, in a region where the speed ratio e is smaller than the coupling point, the first teeth and the second teeth are permitted to engage owing to the (relatively stronger) urging force by introducing into the fluid chamber the fluid pressure which is weaker than the urging force.

Also in the above-mentioned aspect of performance, the first teeth of the outer race are fixed with the stator in the rotational direction thereof, while the second teeth of the inner race are fixed with the stationary shaft in the rotational direction thereof. Eventually, therefore, the rotation and fixation of the stator (with respect to the stationary shaft) are respectively realized by the disengagement and engagement between the first teeth and the second teeth.

Also in this aspect, the first teeth of the outer race and the second teeth of the inner race can be disengaged in the idle mode, so that the increase of the power loss ascribable to the frictional force and the production of the shock noise can be reliably prevented.

Incidentally, in the above-mentioned aspect of performance, the outer race and the inner race are engaged and disengaged by the urging force and the fluid pressure introduced into the fluid chamber. Therefore, it is sufficient that at least one of the outer race and the inner race is axially movable relative to the stationary shaft, and it is not always necessary that the stator itself is axially movable (relative to the stationary shaft).

Besides, the above-mentioned aspect of performance features that the fluid pressure is employed for reliably "disengaging" the first teeth and the second teeth. In this aspect, accordingly, a practicable construction which serves to afford the "urging force" for "engaging" the first teeth and the second teeth shall not be especially restricted. By way of example, mechanical means such as the wave spring may well be used as in the prior art, or the fluid pressure within the torque converter can also be utilized as in a further aspect of performance.

In this case (where the fluid pressure within the torque converter is utilized), any urging member such as the wave spring is not used. Therefore, the number of components can be decreased, and the axial dimension of the torque converter can be shortened still further.

By the way, another preferable aspect of performance is such that, when the fluid pressure acting on the blades of the stator functions as the urging force for disengaging the first teeth and the second teeth, the drain pressure of the torque converter is utilized for assisting in the disengagement.

Thus, a pressure difference which serves as the force for disengaging the outer race and the inner race becomes great.

Therefore, the outer race and the inner race can be reliably disengaged in the coupling region, and the increase of the power loss ascribable to the frictional force and the production of the shock noise in the idle mode can be prevented more reliably.

Still another aspect of performance of the present invention may well be so constructed that the fluid pressure is increased through the rotation of the stator by the action of a pump member which is provided unitarily with the stator, and that the increased discharge pressure of the pump member is introduced into the fluid chamber which is formed between the first side face of the outer race and the second side face of the inner race.

Thus, the problems can be similarly solved with the operation of the one-way clutch ensured.

Also in the aspect of performance defined in claim 6, it is naturally possible to utilize the internal fluid pressure of the torque converter as the urging force which urges at least one of the outer race and the inner race toward the other.

Also in this case, any urging member such as the wave spring is not employed, so that the number of components can be decreased, and that the axial dimension can be shortened still further.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein:

FIG. 3 is an explanatory diagram showing a situation where the direction of a fluid stream acting on a stator changes depending upon the speed ratio between the output shaft and input shaft of the torque converter;

FIGS. 4A and 4B are developed sectional views similar to FIGS. 2A–2C, each showing the modifications of the first teeth and the second teeth in the first aspect of performance;

FIGS. 8A and 8B are developed sectional views corresponding to FIGS. 2A–2C, each showing a circumferential section taken along line VIII—VIII indicated by arrows in FIG. 7;

DETAILED DESCRIPTION OF THE PREFERRED EMBODIMENTS

Now, examples of the more practicable aspects of performance of the present invention will be described in detail with reference to the drawings.

Figure 1:
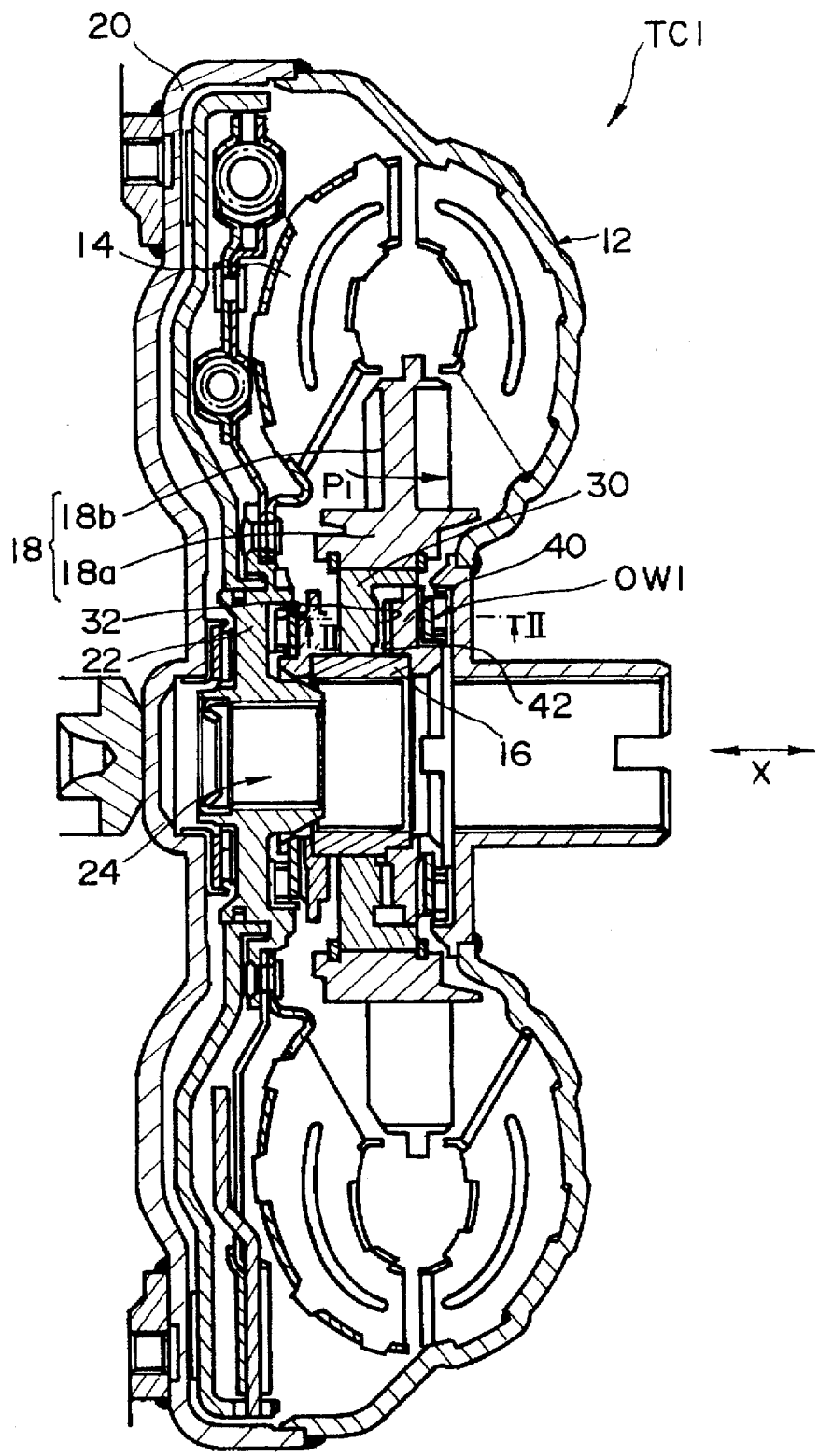
FIG. 1 is a vertical sectional view of a torque converter showing the first aspect of performance of the present invention.

FIG. 1 is a vertical sectional view showing the outline of a torque converter TC1 which is equipped with a one-way clutch mechanism according to the first aspect of performance of the present invention.

The torque converter TC1 includes a pump impeller 12 which generates a fluid stream, a turbine runner 14 which is rotated by the fluid stream, a stationary shaft (concretely, a hub member) 16, and a stator 18 which is arranged between the pump impeller 12 and the turbine runner 14 so as to receive a turning force from the fluid stream.

The pump impeller 12 is united with a front cover 20 which is connected with an unshown engine, and is rotated by the engine.

The turbine runner 14 is mounted on the output shaft (which is fittingly inserted in a recess 24 depicted in FIG. 1, and which is not shown) of the torque converter TC1 through a turbine hub 22.

The stationary shaft 16 is united with the fixing member, not shown, of the torque converter TC1.

The stator 18 has a stator hub 18a on its inner circumferential side, and has blades 18b on the outer circumference of the stator hub 18a.

The basic construction thus far explained is the same as in the prior art.

The stator 18 is furnished with a one-way clutch OW1. The one-way clutch OW1 connects and fixes the stator 18 to the stationary shaft 16 when the blades 18b of the stator 18 have received the turning force of one specified direction from the fluid stream. In contrast, the one-way clutch OW1 allows the stator 18 to rotate (to rotate in the idle mode of this clutch) when the stator blades 18b have received the turning force of the other direction. Thus, in the region where the speed ratio e is smaller than the coupling point as explained before, the stator 18 can give the fluid stream a reaction force (owing to its fixed state), thereby to contribute to the amplification of a torque. Also, in the region where the speed ratio e is greater than the coupling point as explained before, the stator 18 rotates, thereby to relieve the power loss of the torque converter TC1.

The one-way clutch OW1 includes an outer race 30 and an inner race 40.

The outer race 30 is united with the stator hub 18a forming the inner circumferential side of the stator 18. The outer race 30 supports the stator 18 so as to be movable in the axial direction X of the torque converter TC1 and rotatable with respect to the stationary shaft 16. Besides, the outer race 30 has a first side face 32 which is perpendicular to the axis (the axial direction) X. The first side face 32 is formed with first teeth 34 (indicated in FIGS. 2A~2C).

The inner race 40 is united with the stationary shaft 16 on the outer circumferential side thereof.

This inner race 40 has a second side face 42 which is opposite to the first side face 32 of the outer race 30. The second side face 42 is formed with second teeth 44 (indicated in FIGS. 2A~2C) which can prohibit the outer race 30 from rotating in one direction, in mesh (or engagement) with the first teeth 34 of the outer race 30.

Figure 2C:
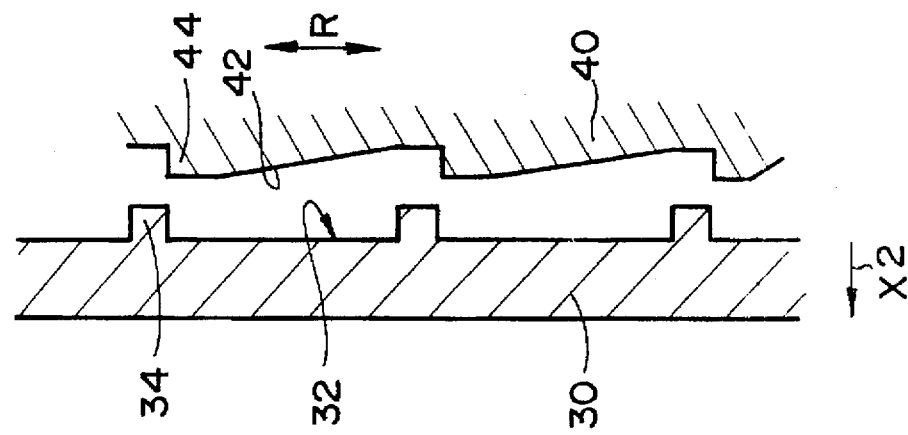
FIGS. 2A–2C are developed sectional views of a circumferential section taken along line II—II indicated by arrows in FIG. 1, each showing the engagement state between the first teeth of an outer race and the second teeth of an inner race in the first aspect of performance.
Figure 2B:
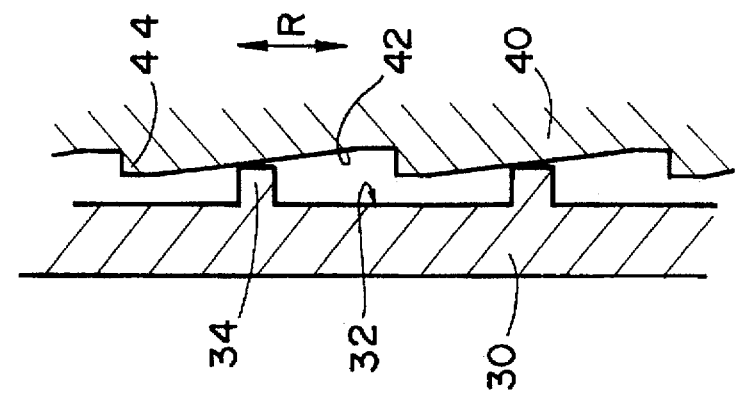
Figure 2A:
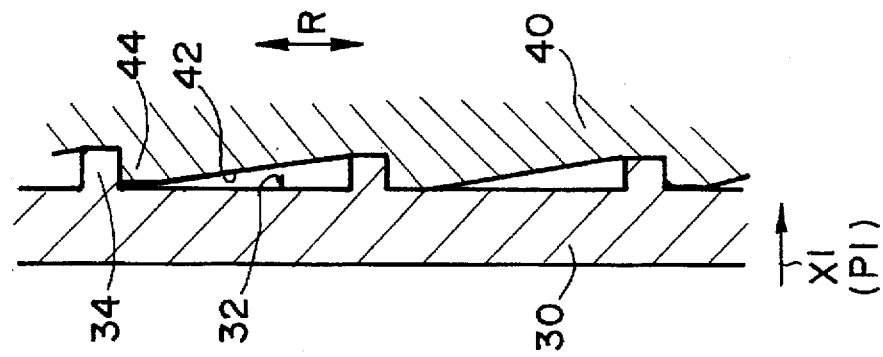

FIGS. 2A~2C are developed sectional views each showing a section in the circumferential direction R of the torque converter TC1 as taken along line II—II indicated by arrows in FIG. 1. As seen from FIGS. 2A~2C, the first teeth 34 of the outer race 30 are formed in a plurality of places in the circumferential direction R so as to protrude from the first side face 32 radially of the torque converter TC1 (perpendicularly to the drawing sheet of FIGS. 2A–2C). Besides, each of the second teeth 44 of the inner race 40 is formed on the second side face 42 in a saw-tooth shape in correspondence with each of the first teeth 34 of the outer race 30.

Next, the operation of the first aspect of performance will be described.

In the region where the speed ratio e is smaller than 1 (one) (e<1) as illustrated in FIG. 3, the fluid stream flows from the left side toward the right side as viewed in each figure (any of FIG. 1, FIGS. 2A~2C and FIG. 3), and the blades 18b of the stator 18 receive a pressure P1 from the fluid stream.

Accordingly, an axial component force X1 having a direction from the left side to the right side as viewed in each figure is generated by the pressure P1 based on the fluid stream. Therefore, the stator 18 is moved rightwards as viewed in each figure, while at the same time, the outer race 30 unitary with the stator 18 is also moved rightwards as viewed in each figure, in other words, onto the side of the inner race 40. In consequence, the first teeth 34 of the outer race 30 are engaged with the second teeth 44 of the inner race 40 as shown in FIG. 2A.

The outer race 30 is unitary with (the stator hub 18a of) the stator 18, while the inner race 40 is unitary with the stationary shaft 16. Therefore, the engagement between the first teeth 34 and the second teeth 44 prevents the rotation of the outer race 30, to fix the stator 18.

On the other hand, in the region where the speed ratio e is greater than 1 (one) (e>1), the stator 18 and the outer race 30 unitary therewith receive an axial component force X2 having a direction from the right side to the left side as viewed in each figure, from the fluid stream. Accordingly, the stator 18 (as well as the outer race 30 unitary with this stator 18) is moved leftwards as viewed in each figure, by the axial component force X2. In consequence, the first teeth 34 of the outer race 30 are disengaged from the second teeth 44 of the inner race 40 as shown in FIG. 2C. The outer race 30 is therefore permitted to freely rotate (to rotate in the idle mode of the clutch OW1) by receiving the turning force of the fluid stream entered through the blades 18b of the stator 18.

On this occasion, the first teeth 34 of the outer race 30 and the second teeth 44 of the inner race 40 rotate out of touch with each other. Therefore, a power loss ascribable to a frictional force is not incurred, and a shock noise (an abnormal sound) at the touch between the first teeth 34 and the second teeth 44 is not produced, either.

Incidentally, FIG. 2B illustrates a state intermediate between the state of FIG. 2A and that of FIG. 2C, i.e., a state at and near the speed ratio e=1. The intermediate state will be explained later.

FIGS. 4A and 4B illustrate the modifications of the first teeth of the outer race and the second teeth of the inner race.

In the modification shown in FIG. 4A, each of the first teeth 34A of the outer race 30 is formed in a saw-tooth shape which corresponds substantially to the shape of each of the second teeth 44A of the inner race 40. Owing to such tooth profiles, the oblique planes 34Aα of the first teeth 34A and those 44Aβ of the second teeth 44A are permitted to touch, so that an oil film is easily formed here. It is accordingly possible to effectively prevent a shock noise from rising and the first and second teeth from damaging.

On the other hand, according to the modification shown in FIG. 4B, in order to better the performance of the modification shown in FIG. 4A, each of the second teeth 44B of the inner race 40 is furnished with a roller 44B1. Moreover, with the intention of bringing the roller 44B1 into favorable touch with the oblique plane 34Bα of each of the first teeth 34B of the outer race 30, the angle of inclination θ1 of the oblique plane 34Bα is set smaller than the angle of inclination θ2 of the oblique plane 44Bβ of each second tooth 44B (that is, θ1<θ2 is held). Thus, the oblique plane 34Bα of each first tooth 34B is permitted to reliably come into rolling contact with the roller 44B1.

As a result, the level of the shock noise can be lowered still further, and the durability of the one-way clutch OW1 can be enhanced more.

Incidentally, in the first aspect of performance, the stationary shaft 16 and the inner race 40 are prepared as the separate members, which are thereafter united. Needless to say, however, they may well be constructed in the form of a unitary structure from the beginning by way of example.

Thus, the number of components of the torque converter can be made still smaller, the strength thereof can be enhanced more, and the axial dimension thereof can be shortened still further.

Meanwhile, when the speed ratio e is 1 (one) or in the vicinity thereof, the axial component force does not act on the stator 18 in any direction. Accordingly, in a case where the stator 18 has started rotating (beyond the coupling point) on this occasion, the outer race 30 and the inner race 40 may possibly start their relative rotation while the first teeth 34 and the second teeth 44 lie in touch in the state as shown in FIG. 2B. In this case, the first teeth 34 can rotate along the inclination of the second teeth 44, so that any serious obstacle does not especially occur. Since, however, the first teeth 34 and the second teeth 44 lie in touch, some abnormal sound rises, and some power loss develops.

As one idea or expedient for relieving this problem even slightly from a structural standpoint, it is considered that, as stated in the section "SUMMARY OF THE INVENTION", the point at which the axial component force reverses is shifted from the vicinity of e=1 onto the side of the coupling point as far as possible.

Considered as another idea is that the fluid pressure itself is utilized, not the axial component force of the fluid pressure.

It is the ensuing second aspect of performance that is founded on this idea.

Figure 5:
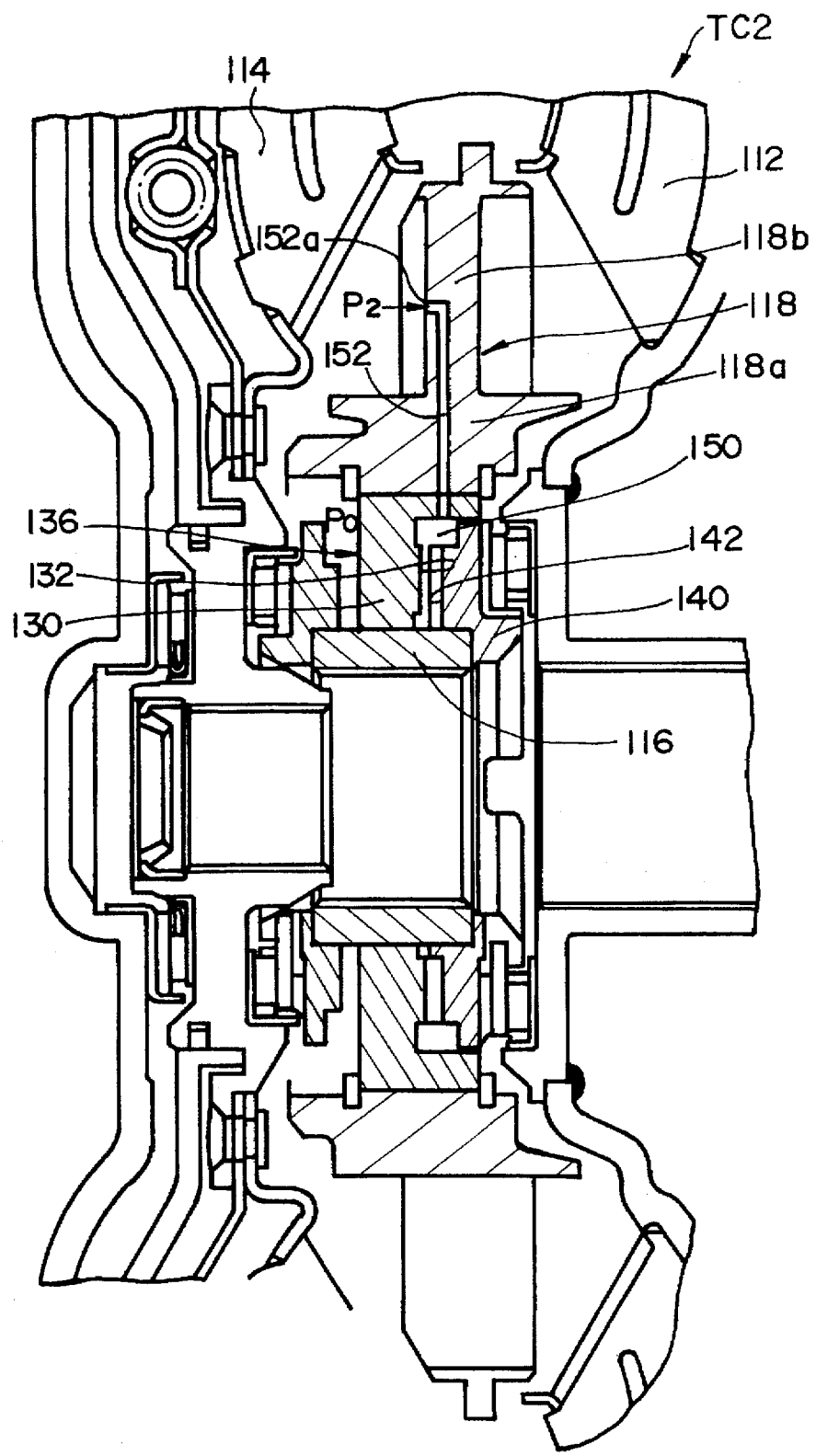
FIG. 5 is an enlarged vertical sectional view of and near the stator of a torque converter, showing the second aspect of performance of the present invention.

According to the second aspect of performance, as shown in FIG. 5, a fluid chamber 150 is formed between the first side face 132 of an outer race 130 and the second side face 142 of an inner race 140. A fluid pressure P2 which acts on the blades 118*b* of a stator 118 is introduced into the fluid chamber 150 through an oil passage 152.

On the other hand, the one-way clutch of a torque converter TC2 in this aspect of performance is so set that a fluid pressure (feed pressure) P0 near the stator hub 118*a* of the torque converter TC2 can act on the face 136 of the outer race 130 remote from the first side face 132 thereof. Accordingly, the outer race 130 is always urged toward the inner race 140 by the fluid pressure P0.

Figure 6:
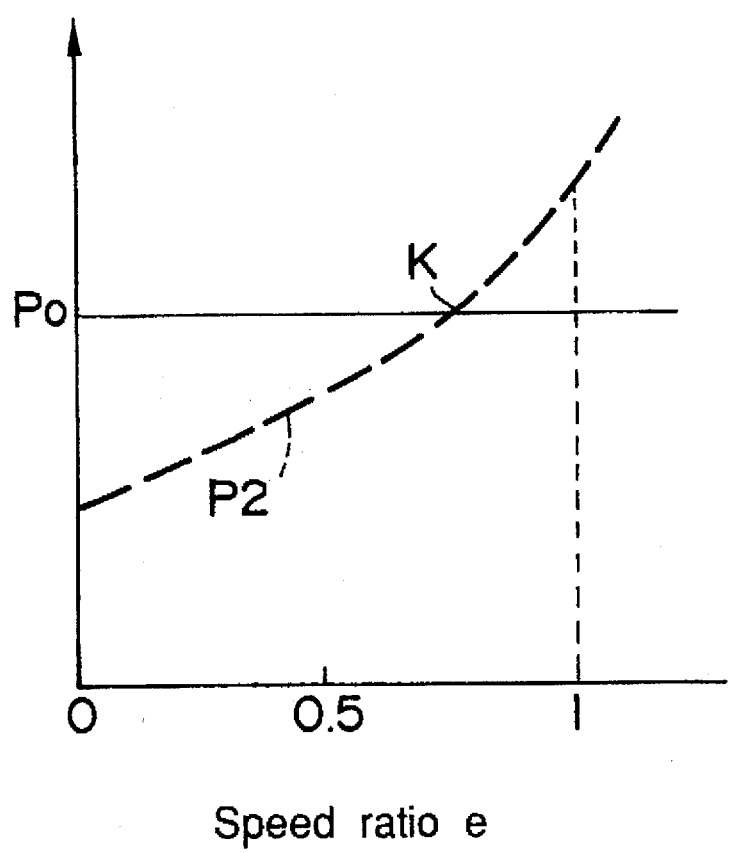
FIG. 6 is a graph showing the relationship between a feed pressure in the torque converter and a fluid pressure acting on the blades of a stator.

FIG. 6 illustrates the relationship between the fluid pressure P0 near the stator hub 118*a* and the fluid pressure P2 acting on the blades 118*b* of the stator 118. As seen from the figure, the fluid pressure P0 near the stator hub 118*a* is substantially constant at all times irrespective of the change of the speed ratio e, whereas the fluid pressure P2 acting on the blades 118*b* of the stator 118 changes its value in dependency on the speed ratio e as indicated by a thick broken line. The characteristics of the fluid pressure P2 are subtly changed by slightly changing the position of the intake port 152*a* of the oil passage 152. Therefore, a place where the point of intersection K between the fluid pressures P0 and P2 agrees with the coupling point of the stator 118, can be found out by trial-and-error, a simulation calculation, or the like.

Thus, since the condition of P0>P2 can be kept up to the coupling point, under this condition, the stator 118 (as well as the outer race 130) is urged rightwards as viewed in FIG. 5. Accordingly, the first teeth (134) of the outer race 130 and the second teeth (144) of the inner race 140 are brought into engagement, and the stator 118 is fixed.

In contrast, the inequality of P0<P2 comes to hold true in the region where the speed ratio e is greater than the coupling point. Therefore, the outer race 130 (as well as the stator 118) is pushed back leftwards as viewed in FIG. 5, by the fluid pressure P2. Accordingly, the first teeth (134) of the outer race 130 and the second teeth (144) of the inner race 140 are disengaged, and the outer race 130 (as well as the stator 118) is permitted to freely rotate (to rotate in the idle mode of the clutch of the torque converter TC2).

Here in the second aspect of performance, the fluid chamber 150 is defined between the first side face 132 of the outer race 130 and the second side face 142 of the inner race 140, and the fluid pressure P2 acting on the blades 118*b* of the stator 118 is directly introduced into the fluid chamber 150, thereby to disengage the outer race 130 and the inner race 140. It is therefore possible to attain engagement/disengagement movements which are more accurate than in the case where the axial component force of the fluid stream is utilized as in the foregoing first aspect of performance.

Incidentally, since the remaining construction and operation of this aspect of performance are similar to those of the first aspect of performance, merely numerals each having the same two lower digits as in the first aspect of performance shall be assigned to identical or similar parts in FIG. 5, without the repeated explanation of the parts.

Figure 7:
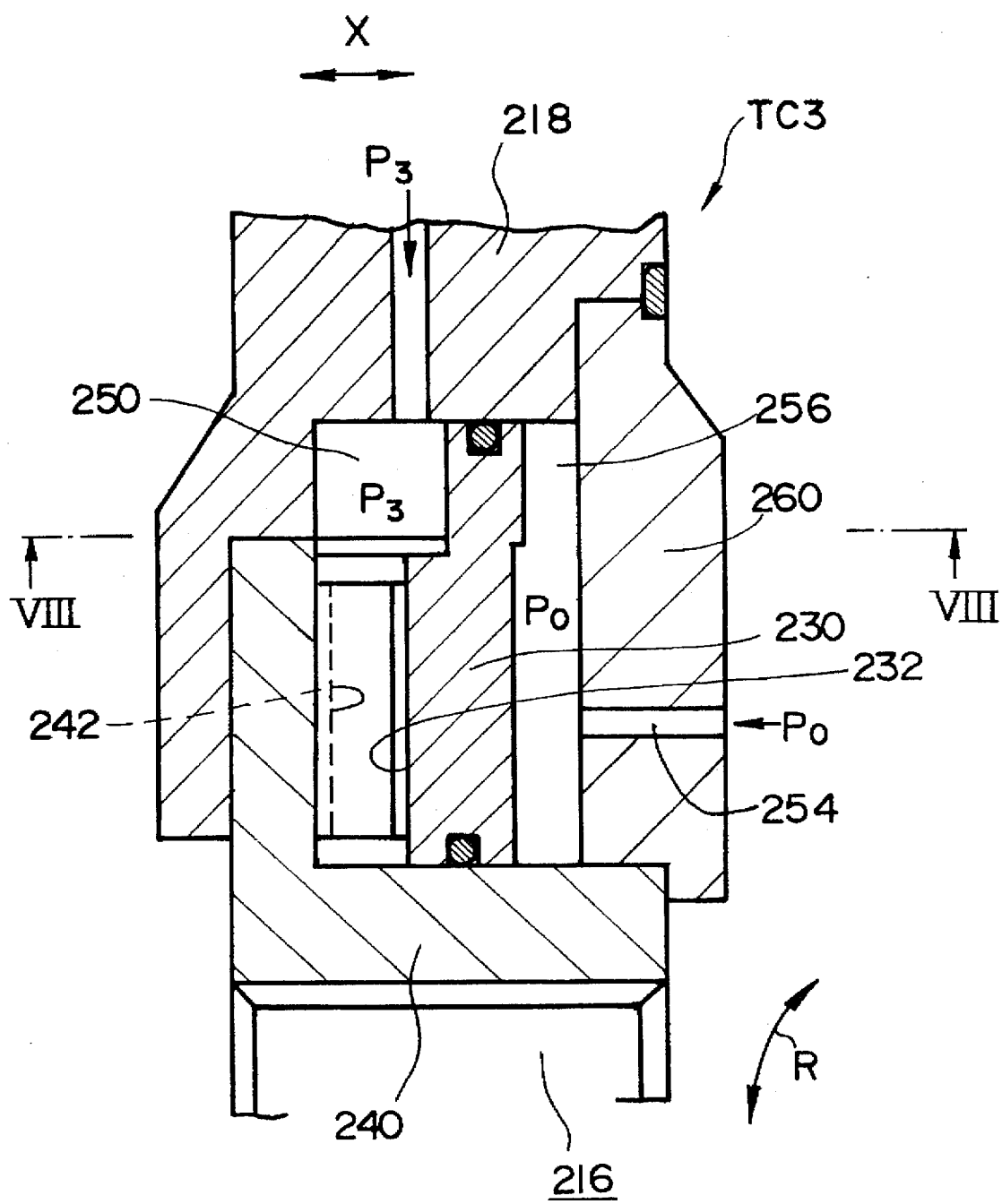
FIG. 7 is an enlarged vertical sectional view of a one-way clutch mechanism, showing the third aspect of performance of the present invention.

Next, FIG. 7 illustrates the third aspect of performance of the present invention.

In the third aspect of performance, a stator 218 is fixed in the axial direction X of a torque converter TC3 just as in the prior art. An inner race 240 is united with a stationary shaft 216 both in the axial direction X and in the rotational direction R of the stator 218. An outer race 230 is movable in the axial direction X in the space between the stator 218 and the inner race 240, and is united with the stator 218 as regards the rotational direction R. That is, only the outer race 230 is axially (X) moved to realize the engagement and disengagement between this outer race 230 and the inner race 240. Numeral 260 designates a retainer.

A fluid chamber 250 is defined between the first side face 232 of the outer race 230 and the second side face 242 of the inner race 240, and a fluid pressure P3 acting on the blades (not shown in FIG. 7) of the stator 218 is introduced into the fluid chamber 250. As shown in FIG. 8A, the fluid pressure P3 realizes the disengagement between the outer race 230 and the inner race 240 in the region of the speed ratio e greater than the coupling point, and it permits the stator 218 to rotate. By the way, FIGS. 8A and 8B are sectional views taken along line VIII—VIII in FIG. 7.

On the other hand, in order to always urge the outer race 230 onto the side of the inner race 240 (at least, in the region where the speed ratio e is smaller than the coupling point), the fluid pressure P0 near the stator hub (218*a*) of the torque converter TC3 is utilized as urging means likewise to that in the foregoing second aspect of performance, as shown in FIG. 7 and FIG. 8B. That is, the outer race 230 is urged by introducing the fluid pressure P0 into a back pressure chamber 256 through an oil passage 254.

Figure 19:
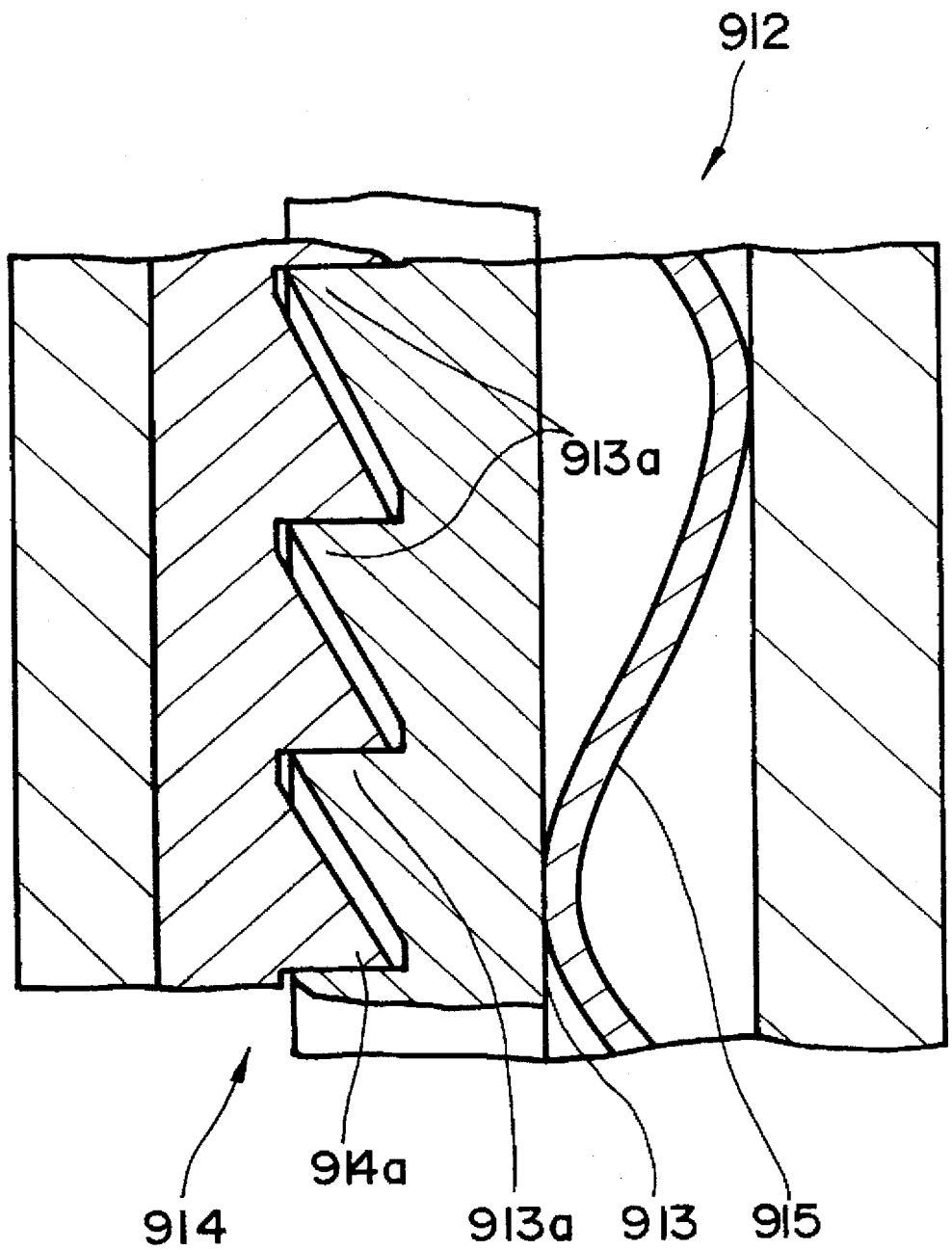
FIG. 19 is a vertical sectional view showing the one-way clutch mechanism of a torque converter in the prior art.

Regarding the bestowal of an urging force, however, an urging spring such as the wave spring may well be arranged in the back pressure chamber 256 just as in the prior art shown in FIG. 19, by way of example.

Incidentally, the remaining construction and operation of this aspect of performance are similar to those of the foregoing aspects of performance, and basically the same effects are brought forth.

Next, the fourth aspect of performance will be described.

By the way, the aspects of performance to be stated below, including this aspect of performance, consist in that the production of an interference noise in the idle mode of a one-way clutch is prevented by the reliable release of the one-way clutch.

Figure 9:
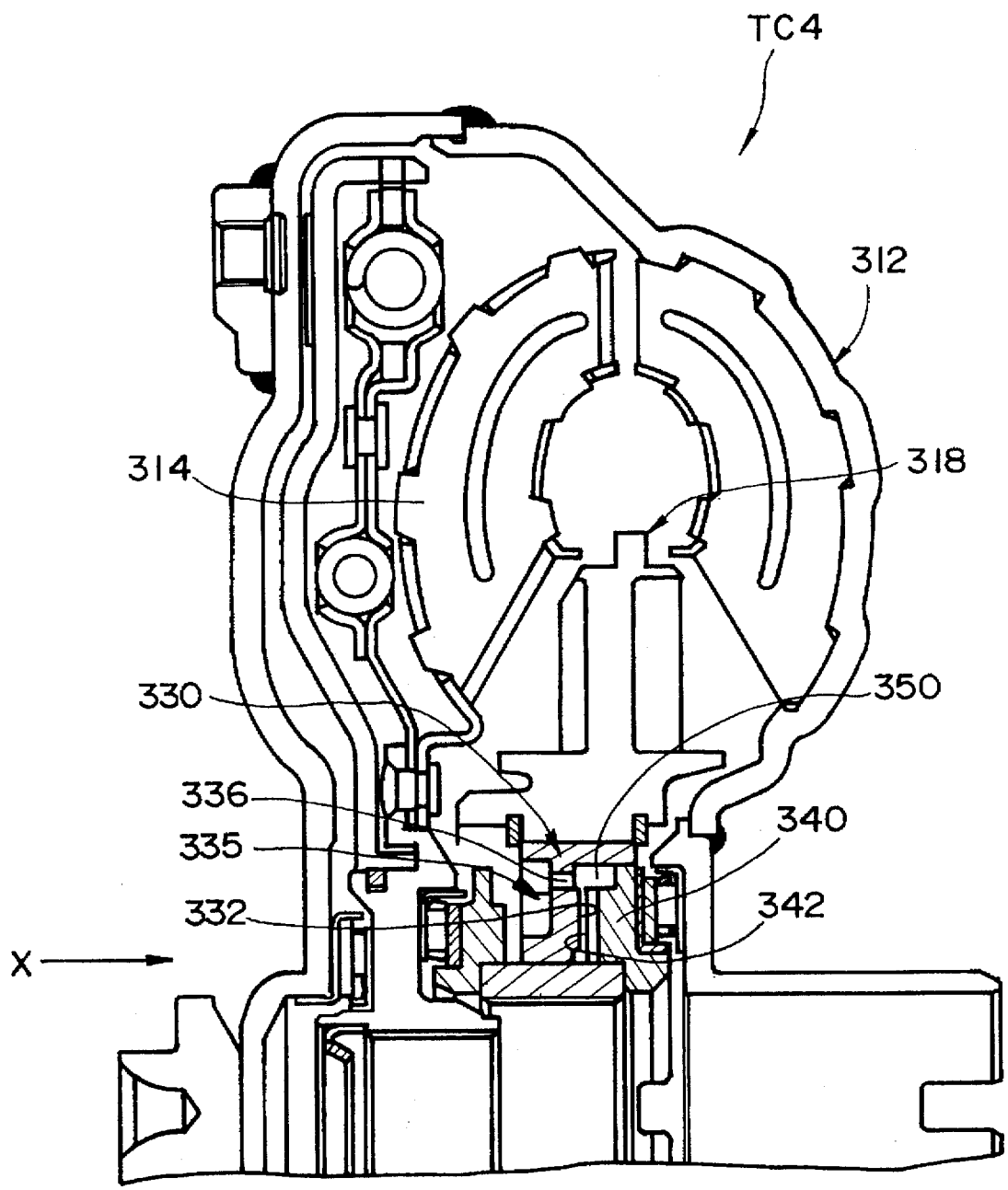
FIG. 9 is a vertical sectional view showing the outline of a torque converter which is equipped with a one-way clutch mechanism according to the fourth aspect of performance.

FIG. 9 is a vertical sectional view showing the outline of a torque converter TC4 which is furnished with a one-way clutch mechanism according to the fourth aspect of performance.

Also in the fourth aspect of performance shown in FIG. 9, a fluid chamber 350 is formed between the first side face 332 of an outer race 330 and the second side face 342 of an inner race 340 just as in the second aspect of performance shown in FIG. 5. Here, as to the engagement between the outer race 330 and the inner race 340, the axial component force of the fluid pressure acting on a stator 318 is utilized in basically the same manner as in the first aspect of performance. As to the disengagement between the constituents 330 and 340, however, the fluid pressure is introduced into the fluid chamber 350 so as to ensure this disengagement. This aspect of performance consists in that a member for a pumping action is disposed in order to introduce the fluid pressure after being increased.

The outer race 330 has recesses 335 and through holes 336. This outer race 330 plays the role of the pump member during its rotation. That is, owing to the rotation of the outer race 330, a liquid gathered in the recesses 335 is discharged from the through holes 336 into the fluid chamber 350. This operation will now be detailed.

Figure 10:
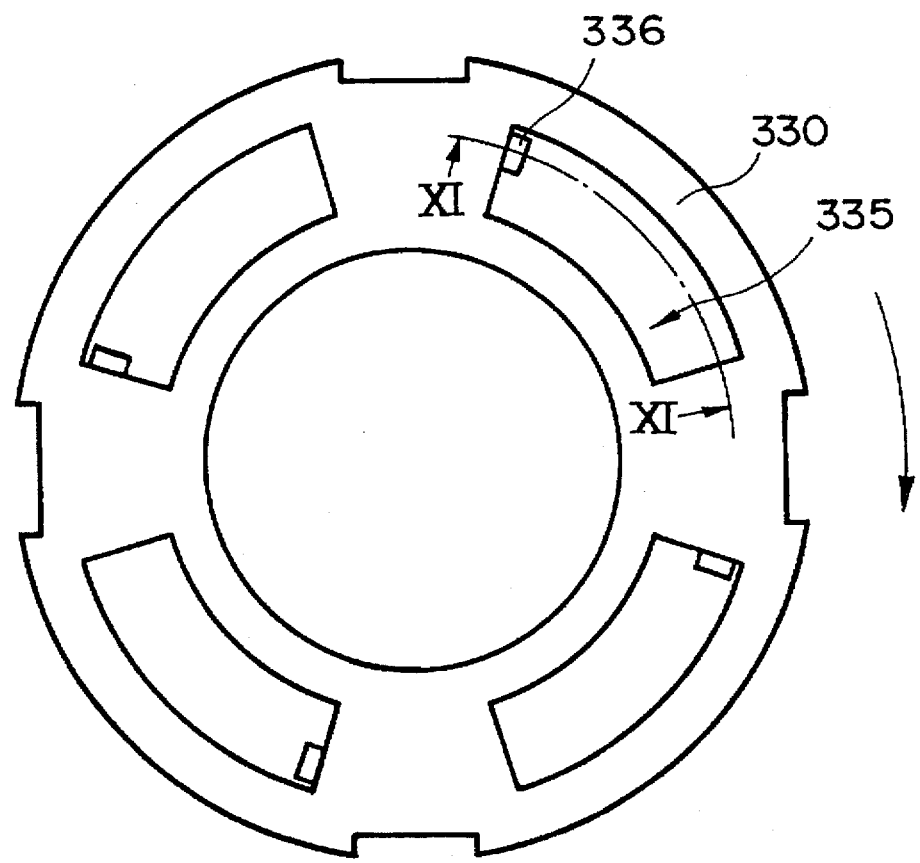
FIG. 10 is a front view of an outer race depicted in FIG. 9 as seen in an X-direction.
Figure 11:
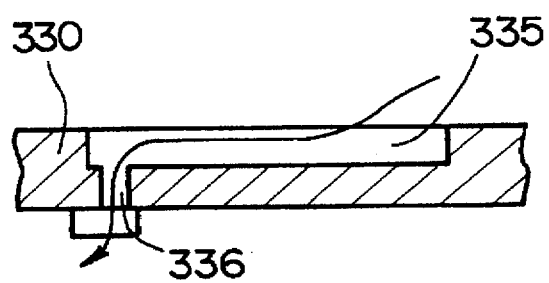
FIG. 11 is a sectional view taken along line XI—XI indicated in FIG. 10.

FIG. 10 illustrates a front view of the outer race 330 as seen in an X-direction indicated in FIG. 9. Besides, FIG. 11 illustrates a sectional view taken along line XI—XI indicated in FIG. 10.

As shown in FIG. 10, the outer race 330 is formed with the plurality of (four) rectangular recesses 335 on an identical circumference. As shown in FIG. 11, each of the recesses 335 has the through hole 336 at its end part.

When the outer race 330 is rotated in the direction of an arrow indicated in FIG. 10, the fluid in each of the recesses 335 relatively moves in the reverse direction to the rotational direction of the outer race 330. As a result, a fluid stream as shown by an arrow in FIG. 11 is generated, and the fluid pressure based on the fluid stream is introduced into the fluid chamber 350.

When the fluid pressure has been introduced into the fluid chamber 350, a pressure within the fluid chamber 350 is raised. Owing to the internal pressure, the outer race 330 is moved leftwards as viewed in FIG. 9. In consequence, the outer race 330 and the inner race 340 are reliably disengaged. Thus, the interference noise in the idle mode of the one-way clutch can be prevented more reliably. Moreover, in this case, the member for the pumping action is made merely by machining the aforementioned constituent (the outer race 330) and without requiring any new constituent, so that the one-way clutch can be realized without any appreciable rise in cost.

Incidentally, the outer race 330 and the inner race 340 are engaged in the way that, as in the first aspect of performance, the stator 318 as well as the outer race 330 is axially moved by the axial component force of the fluid pressure acting on the blades of the stator 318. When the outer race 330 and the inner race 340 have been brought into engagement, the former 330 is fixed and is prevented from rotating, so that the pumping action is not effected. This holds true also of the ensuing aspects of performance.

Next, the fifth aspect of performance will be described.

The fifth aspect of performance is basically the same as the fourth aspect of performance. It consists in improving the configuration of the outer race 330 which executes the pumping action in the fourth aspect of performance.

Figure 12:
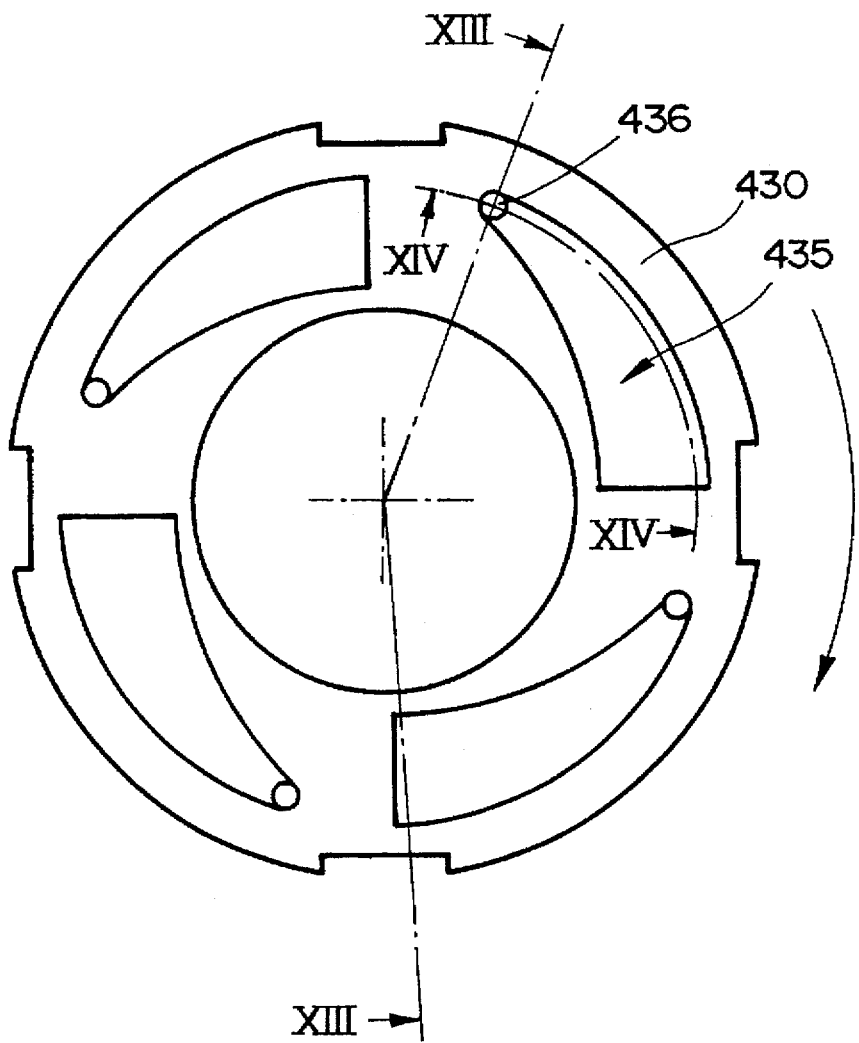
FIG. 12 is a front view of an outer race according to the fifth aspect of performance.
Figure 13:
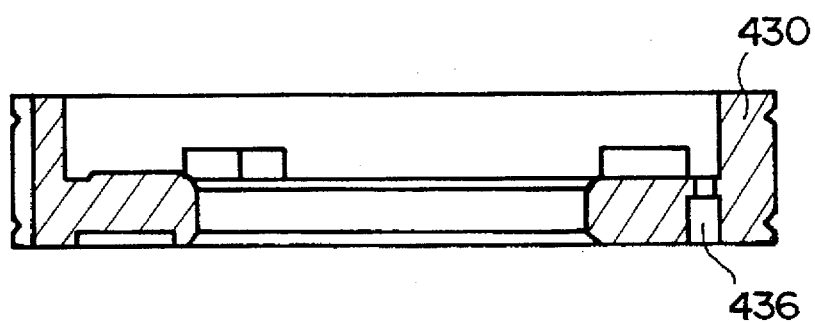
FIG. 13 is a sectional view taken along line XIII—XIII indicated in FIG. 12.
Figure 14:
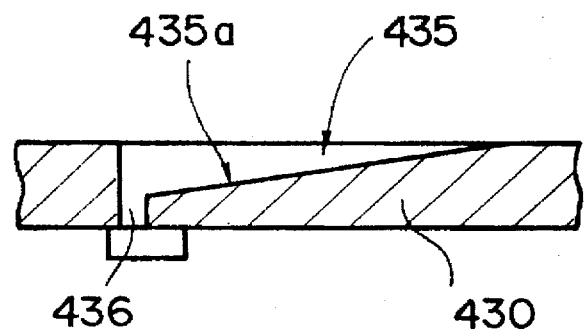
FIG. 14 is a sectional view taken along line XIV—XIV indicated in FIG. 12.

FIG. 12 is a front view of an outer race 430 according to the fifth aspect of performance. Besides, a sectional view taken along line XIII—XIII in FIG. 12 is illustrated in FIG. 13, while a sectional view taken along line XIV—XIV is illustrated in FIG. 14.

As shown in FIG. 12, the outer race 430 is formed with a plurality of (four) triangular recesses 435 on a circumference. Each of the recesses 435 has a tapered bottom 435a as seen from its section shown in FIG. 14. Further, a through hole 436 is provided in the lowermost part of the bottom 435a which corresponds to the vertex of the triangular shape of the recess 435.

When the outer race 430 is rotated in the direction of an arrow indicated in FIG. 12, the fluid in each recess 435 moves in the reverse direction to the rotational direction of the outer race 430. Accordingly, the fluid flows toward the part of the recess 435 gradually decreasing in area, so that the velocity of flow of the fluid is heightened and that the pressure thereof is raised. The raised fluid pressure is introduced from the through hole 436 into a fluid chamber (450). Therefore, the effect of disengaging the outer race 430 and an inner race (440) is enhanced more.

Next, the sixth aspect of performance will be described.

The sixth aspect of performance consists in that the pumping action of the outer race in each of the two preceding aspects of performance is rendered more efficient by disposing additional members.

Figure 15:
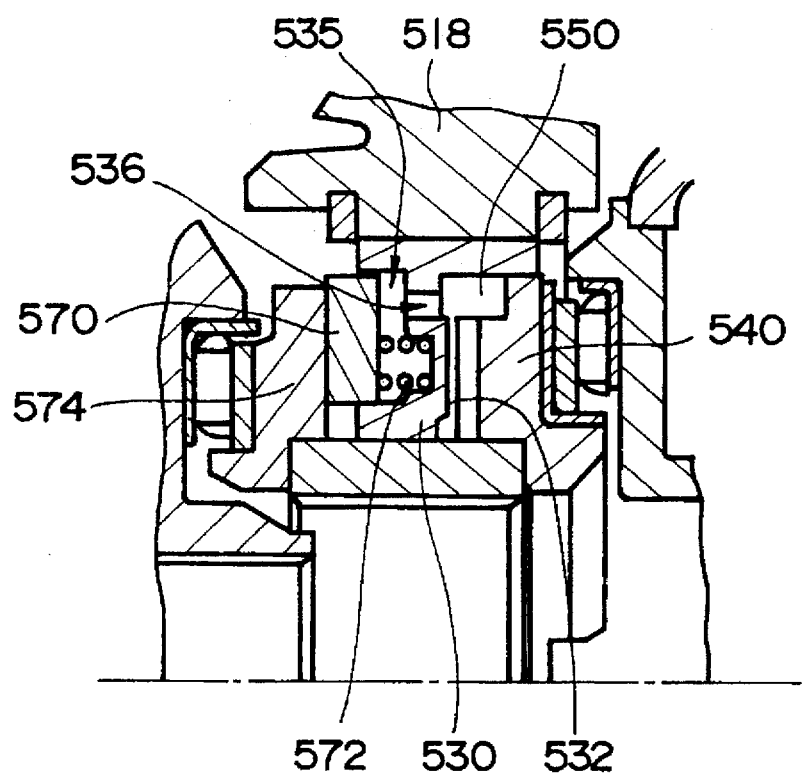
FIG. 15 is a vertical sectional view showing the outline of a one-way clutch mechanism according to the sixth aspect of performance.

FIG. 15 is a vertical sectional view showing the outline of a one-way clutch mechanism according to the sixth aspect of performance.

Referring to FIG. 15, vanes 570 and springs 572 are mounted on the side of an outer race 530 opposite from the first side face 532 thereof. They are guided by a bearing race (stopper member) 574. When the outer race 530 is rotated, the vanes 570 rake up the fluid, and the pumping action is effected.

This aspect will now be detailed.

Figure 16:
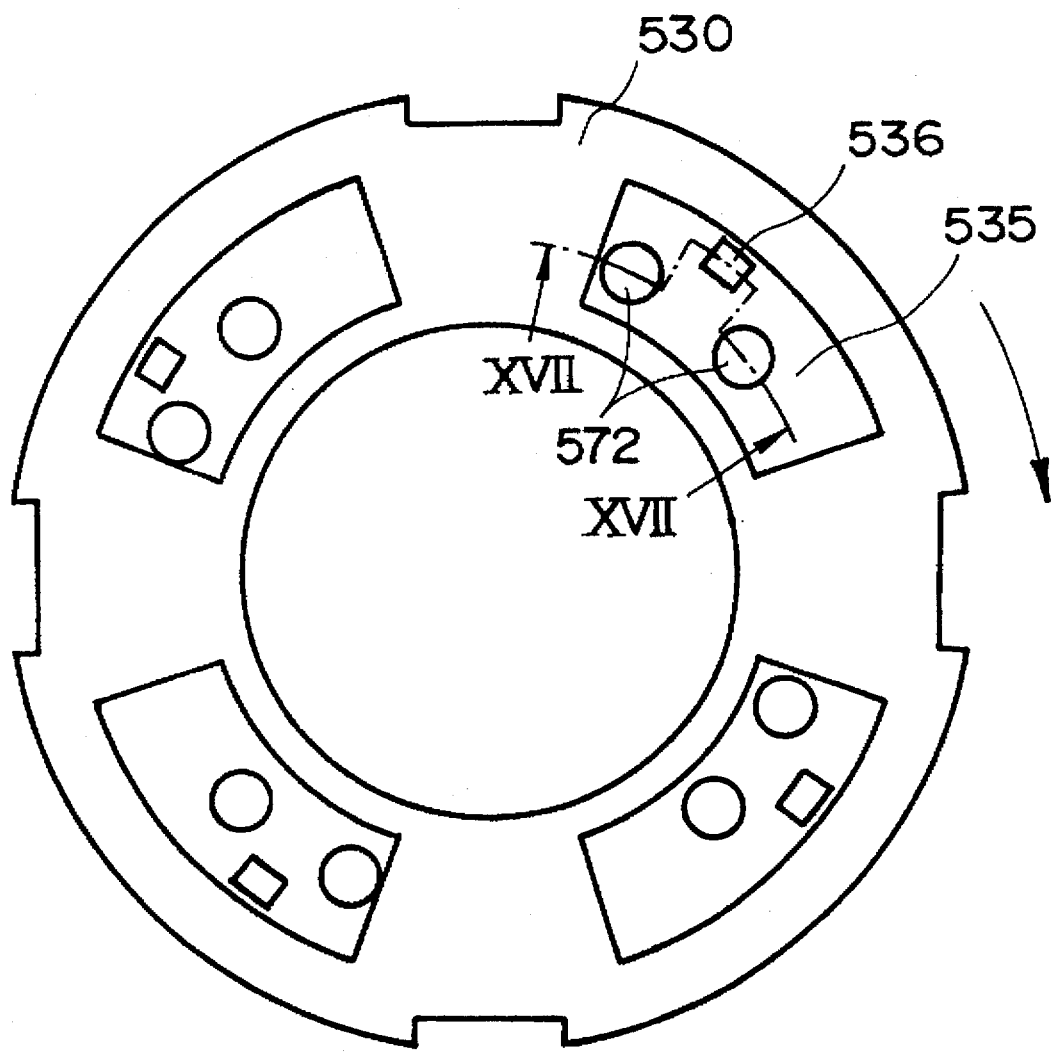
FIG. 16 is a front view of an outer race according to the sixth aspect of performance.

FIG. 16 is a front view correspondent to FIG. 12, showing the outer race 530. The outer race 530 is formed with a plurality of (four) square recesses 535 on a circumference in the same manner as in the fourth aspect of performance. In each of the square recesses 535, a through hole 536 and the two springs 572 are provided. Although not shown in FIG. 16, the vane 570 is arranged in conformity with the configuration of the recess 535. A section taken along line XVII—XVII in FIG. 16 is illustrated in FIGS. 17A and 17B.

Figure 17A:
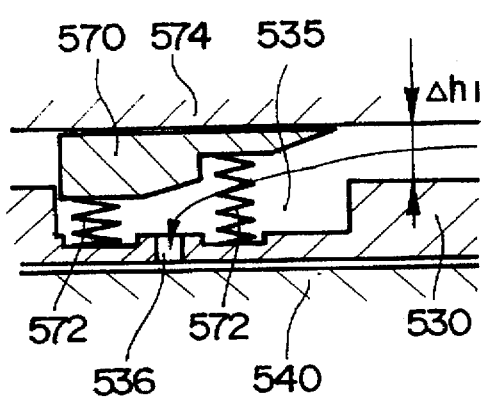
FIGS. 17A and 17B are sectional views each being taken along line XVII—XVII indicated in FIG. 16.
Figure 17B:
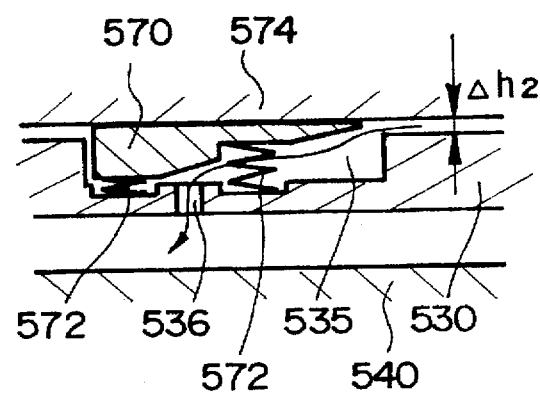

In each of FIGS. 17A and 17B, the vane 570, the bearing race (stopper member) 574 and an inner race 540 are depicted besides the outer race 530. The vane 570 is urged onto the side of the bearing race 574 by the springs 572.

As indicated in FIG. 16, the outer race 530 is rotated in the direction of an arrow. On this occasion, in the state of FIG. 17A, the outer race 530 and the vane 570 are moved rightwards as viewed in the figure. Accordingly, a fluid stream in a direction indicated by an arrow in FIG. 17A arises along the shape of the vane 570, and the fluid flows from the through hole 536 into a fluid chamber 550.

When the fluid has flowed into the fluid chamber 550 and has raised the internal pressure thereof to some extent, the outer race 530 is disengaged from the inner race 540 by the fluid pressure as shown in FIG. 17B.

As seen from FIGS. 17A and 17B, the clearance between the outer race 530 and the bearing race 574 serves as the intake port of the fluid for the recess 535. As indicated by symbols $\Delta h1$ and $\Delta h2$ in FIGS. 17A and 17B, respectively, the clearance becomes smaller as the outer race 530 comes away from the inner race 540 more ($\Delta h1 > \Delta h2$ is held). That is, as the fluid pressure within the fluid chamber 550 rises more, the inflow of the fluid is suppressed more. Thus, the internal fluid pressure of the fluid chamber 550 is prevented from becoming higher unnecessarily, and an excessive frictional force is prevented from developing between the vane 570 and the bearing race 574.

Although the fourth, fifth and sixth aspects of performance described above increase in cost in the order mentioned, they produce higher effects in the pumping action in this order.

Owing to each of these effects of the pumping actions, the first teeth of the outer race and the second teeth of the inner race can be reliably prevented from interfering with each other. It is accordingly possible to prevent the production of a collisional sound and a power loss ascribable to the frictional force. Therefore, a heat treatment for enhancing the durability of each engagement face (the first side face as well as the second side face) is facilitated. Moreover, the resistance of the engagement face to wear does not degrade.

It is the essential point Of any of the above fourth~sixth aspects of performance that the pumping effect is brought forth by the rotation of the stator (the outer race). Thus, the fluid pressure can be generated for reliably disengaging the first teeth and the second teeth in synchronism with the rotation of the stator. It is to be understood that the practicable construction of the pump is not restricted to those in the foregoing aspects of performance, but that a vane pump or a gear pump of ordinary type may well be employed.

Next, the seventh aspect of performance will be described.

Likewise to the second aspect of performance, the seventh aspect of performance consists in that an outer race is disengaged using a fluid pressure introduced into a fluid chamber which is defined between the first side face of the outer race and the second side face of an inner race. Unlike the second aspect of performance, however, the seventh aspect of performance is so constructed that the fluid pressure in the vicinity of the inner circumference of a stator is introduced into the fluid chamber, while a liquid chamber is defined on the side of the outer race opposite from the first side face thereof. Furthermore, a drain pressure is introduced into the liquid chamber so as to disengage the outer race by the differential pressure between the fluid pressure and the drain pressure. Accordingly, the pressure difference greater than in the second aspect of performance can be attained, and the outer race can be reliably disengaged by a greater thrust.

Figure 18:
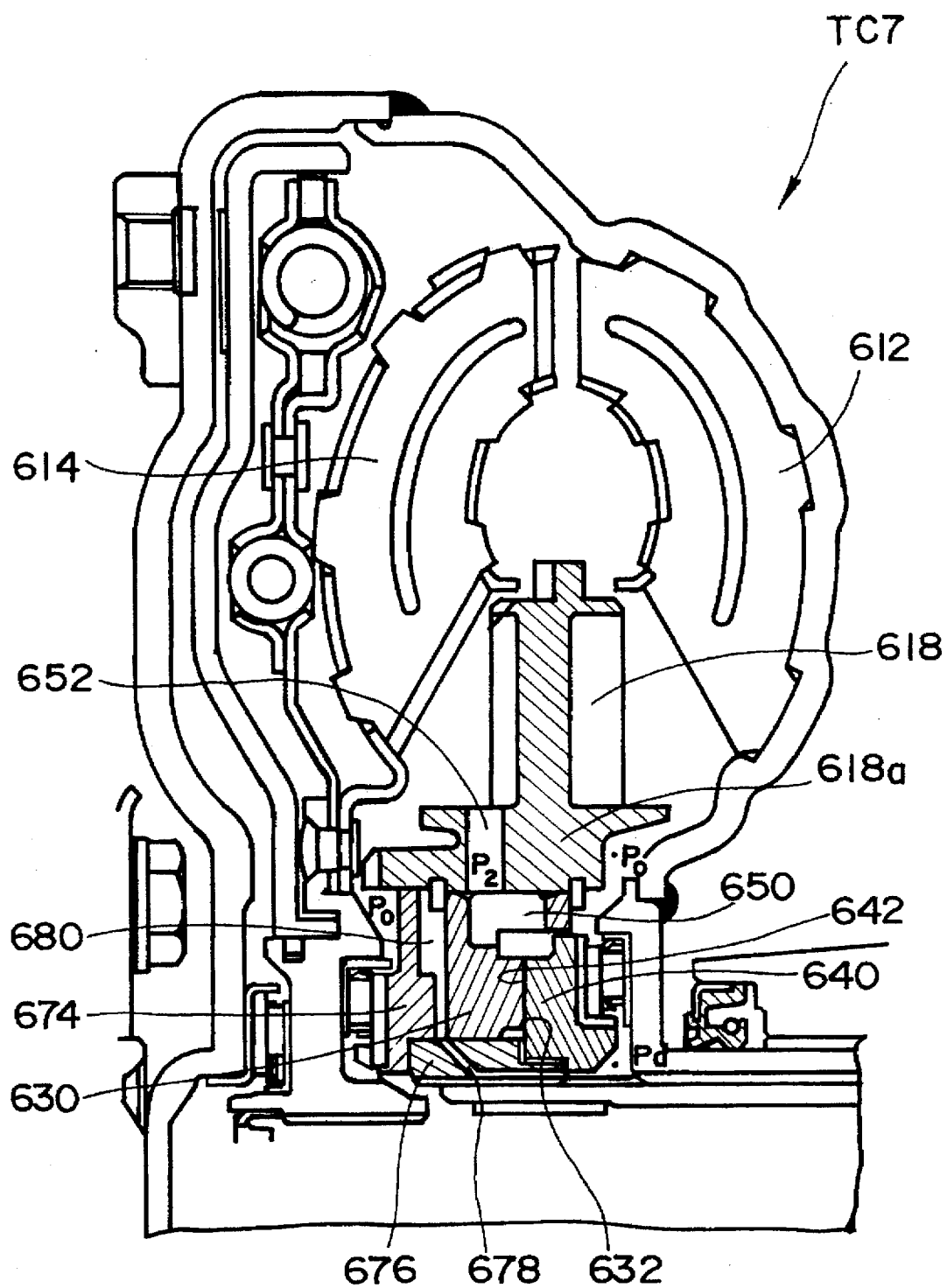
FIG. 18 is a vertical sectional view showing the outline of a torque converter which is equipped with a one-way clutch mechanism according to the seventh aspect of performance.

FIG. 18 is a vertical sectional view showing the outline of a torque converter TC7 according to the seventh aspect of performance.

As shown in FIG. 18, the fluid chamber 650 is formed between the first side face 632 of the outer race 630 and the second side face 640 of the inner race 640. The fluid pressure P2 acting on the stator 618 is introduced into the fluid chamber 650 through an oil passage 652.

On the other hand, the liquid chamber 680 which is surrounded with the outer race 630, a bearing race 674 and a stator hub 618a is formed on the side of the outer race 630 opposite from the first side face 632 thereof. The drain pressure Pd is introduced into the liquid chamber 680 through an oil passage 678 which is provided in an inner hub 676.

In addition, fluid pressures near the stator hub 618a are almost equal on the side of a turbine 614 and on the side of a pump 612, and they shall be denoted by symbol P0. When the stator 618 is to rotate, a relationship indicated by the following inequality (1) is held among the fluid pressure P2, drain pressure Pd and fluid pressure P0:

$$P2 > P0 > Pd \qquad (1)$$

Accordingly, an urging force based on the pressure difference (P2−Pd) acts on the outer race 630. This urging force is greater than the urging force based on the pressure difference (P2−P0) in the second aspect of performance. According to the seventh aspect of performance, therefore, it is possible to disengage the outer race 630 from the inner race 640 more reliably and to eliminate the interference noise in the region where the speed ratio e is greater than the coupling point.

Incidentally, the engagement between the outer race 630 and the inner race 640 in this aspect of performance is similar to that in the second aspect of performance. Besides, since the remaining construction and operation of this aspect of performance are similar to those of the second one, they shall be omitted from detailed description.

As thus far described, according to the present invention, the approach and separation between an outer race and an inner race which constitute a one-way clutch mechanism are realized by utilizing the fluid pressure of a fluid stream in a torque converter (the fluid pressure itself, or the axial component force thereof). Therefore, the outer race and the inner race can be perfectly disengaged in the idle mode of the one-way clutch mechanism. It is accordingly possible to prevent a shock noise (an abnormal sound) from rising and to prevent a frictional power loss from developing.

According to a further aspect of performance, a stator and the outer race united therewith are axially moved by utilizing the axial component force of the fluid stream. Therefore, a wave spring having hitherto been indispensable can be omitted by the simple construction, and the axial dimension of a torque converter can be further shortened to that extent.

According to a further aspect of performance, the fluid pressure of the fluid stream acting on the blades of the stator is introduced into the space between the outer race and the inner race, thereby to disengage the outer race and the inner race. Therefore, the outer race and the inner race can be disengaged by the fluid pressure itself acting on the blades of the stator, so that the engagement and idle rotation between the outer race and the inner race can be switched at a higher precision.

According to a further aspect of performance, the fluid pressure within the torque converter is utilized as an urging force which urges at least one of the outer race and the inner race toward the other. Therefore, the number of components can be decreased.

According to a further aspect of performance, a drain pressure is used as an auxiliary. Therefore, a pressure difference as a force for disengaging the outer race and the inner race can be enlarged, so that the outer race and the inner race can be reliably disengaged in the coupling region of the torque converter.

According to a further aspect of performance, the fluid pressure is introduced into a fluid chamber formed between the outer race and the inner race, by utilizing a pumping action which is generated by the rotation of the stator. It is therefore possible to prevent the shock noise from rising and the frictional power loss from developing, while the disengagement between the outer race and the inner race is ensured.

By the way, in performing the present invention concretely, it is quite optional which of and how the constructions described above are adopted in combination for the purposes of the engagement and disengagement between the first teeth of the outer race and the second teeth of the inner race.

What is claimed is:

1. A one-way clutch mechanism of a torque converter having a pump impeller which generates a fluid stream, a turbine runner which is rotated by the fluid stream, a stationary shaft, a stator which is arranged between the pump impeller and the turbine runner so as to receive a turning force from the fluid stream, and one-way clutch means for connecting the stator to the stationary shaft when the stator has received the turning force of specified direction from the fluid stream, comprising:

an outer race which is assembled on an inner circumferential side of said stator so as to be rotatable together with said stator, and which includes a first side face perpendicular to an axis of said torque converter, said first side face being formed with first teeth; and an inner race which is assembled on an outer circumferential side of said stationary shaft so as to be unrotatable, and which includes a second side face opposite to said first side face of said outer race, said second side face being formed with second teeth which can prohibit said outer race from rotating in one direction, by meshing with said first teeth;

wherein at least one of said outer race and said inner race can be moved axially of said torque converter, so as to engage and disengage said first teeth of said first side face and said second teeth of said second side face; and means for providing at least one of engagement and disengagement of said first teeth of said first side face and said second teeth of said second side face by utilizing a fluid pressure within said torque converter.

2. A one-way clutch mechanism of a torque converter as defined in claim 1, wherein:

said outer race is united with the inner circumferential side of said stator, and supports said stator so as to be axially movable and rotatable relative to said stationary shaft; and said outer race is axially moved by axial component forces of the internal fluid pressures of said torque converter acting on blades of said stator, so as to engage and disengage said first teeth and said second teeth.

3. A one-way clutch mechanism of a torque converter as defined in claim 1, wherein:

said outer race is assembled on the inner circumferential side of said stator so as to be unrotatable, while said inner race is assembled on the outer circumferential side of said stationary shaft so as to be unrotatable, and a fluid chamber is formed between said first side face and said second side face; and the fluid pressure acting on blades of said stator is introduced into said fluid chamber, so as to axially move at least one of said outer race and said inner race and to disengage said first teeth and said second teeth.

4. A one-way clutch mechanism of a torque converter as defined in claim 3, wherein the fluid pressure within said torque converter is utilized as an urging force which urges at least one of said outer race and said inner race toward the other in order to engage said first teeth and said second teeth.

5. A one-way clutch mechanism of a torque converter as defined in claim 3, wherein when said fluid pressure acting on said blades of said stator functions to disengage said first teeth and said second teeth, a drain pressure of said torque converter is utilized for assisting in said disengagement.

6. A one-way clutch mechanism of a torque converter as defined in claim 1, further comprising:

a pump member which is provided unitarily with said stator, and which generates a discharge pressure obtained by increasing the fluid pressure acting on said stator of said torque converter, owing to the rotation of said stator;

wherein said outer race is assembled on the inner circumferential side of said stator so as to be unrotatable, while said inner race is assembled on the outer circumferential side of said stationary shaft so as to be unrotatable, and a fluid chamber is formed between said first side face and said second side face; and the discharge pressure of said pump member is introduced into said fluid chamber, thereby to axially move at least one of said outer race and said inner race and to disengage said first teeth and said second teeth.

7. A one-way clutch mechanism of a torque converter as defined in claim 6, wherein the fluid pressure within said torque converter is utilized as an urging force which urges at least one of said outer race and said inner race toward the other in order to engage said first teeth and said second teeth.

* * * * *